United States Patent [19]

Lucas

[11] Patent Number: 4,547,299
[45] Date of Patent: Oct. 15, 1985

[54] DRILLING FLUID CONTAINING A COPOLYMER FILTRATION CONTROL AGENT

[75] Inventor: James M. Lucas, Houston, Tex.

[73] Assignee: Milchem Incorporated, Houston, Tex.

[21] Appl. No.: 590,029

[22] Filed: Mar. 15, 1984

[51] Int. Cl.$^4$ .................................................. C09K 7/02
[52] U.S. Cl. ............................. 252/8.5 C; 252/8.5 A
[58] Field of Search ............ 252/8.5 A, 8.5 C, 8.55 R

[56] References Cited

U.S. PATENT DOCUMENTS

| | | | |
|---|---|---|---|
| 2,718,497 | 9/1955 | Oldham et al. ...................... | 252/8.5 |
| 3,679,000 | 7/1972 | Kaufman ......................... | 252/8.55 X |
| 4,293,427 | 10/1981 | Lucas et al. .......................... | 252/8.5 |
| 4,309,523 | 1/1982 | Engelhardt et al. ............ | 252/8.5 X |
| 4,404,111 | 9/1983 | Bi et al. ................................. | 252/8.55 |
| 4,455,240 | 6/1984 | Costello ................................ | 252/8.5 |

*Primary Examiner*—Herbert B. Guynn
*Attorney, Agent, or Firm*—Norvell & Associates

[57] ABSTRACT

The invention relates to an aqueous drilling fluid composition, a filtration control agent for utilization in said aqueous drilling fluid, and a method of forming a filter cake on the wall of a well for the reduction of filtrate from said drilling fluid, by utilization of a copolymer of: (1) a (meth) acrylamido alkyl sulfonic acid or alkali metal salt thereof; and (2) N, N-dialkyl (meth) acrylamide. The copolymer may be cross-linked with N,N'-methylenebisacrylamide or other appropriate cross-linking agent.

23 Claims, No Drawings

DRILLING FLUID CONTAINING A COPOLYMER FILTRATION CONTROL AGENT

BACKGROUND OF THE INVENTION

1. Field of the Invention

The invention relates to the utilization of a copolymer of: (1) a (meth)acrylamido alkyl sulfonic acid or alkali metal salt thereof; and (2) N,N-dialkyl(meth)acrylamide or a cross-linked copolymer of (1) and (2) above, to effectively reduce the filtrate loss of an aqueous drilling fluid used in the drilling completion or workover of a subterranean well.

2. Description of the Prior Art

It is generally agreed among those skilled in the art that a rotary system is an acceptable form of drilling an oil or gas well. This system depends upon the rotation of a string of drill pipe to the bottom of which is attached a multi-pronged drilling bit. The bit cuts into the earth causing the cuttings to accumulate as drilling continues. As a result, a drilling fluid must be used to carry these cuttings to the surface for removal, thus allowing the bit to continue functioning and the bottom hole to be kept clean and free of cuttings at all times. Drilling systems other than the rotary system are sometimes employed during drilling operations. Nevertheless, these systems still require a drilling fluid to remove the bore hole cuttings and to otherwise perform functions related to drilling fluids.

Oil-producing formations are generally porous layers having varying degrees of permeability to the flow of fluids such as oil, water, or gas. Consequently, the rate of oil production is largely determined by the rate of flow through these permeable formations which, in turn, is dependent upon the porosity or permeability of the sand or stone present. In drilling through such a porous layer, it is desirable to employ a drilling fluid having such characteristics that excessive amounts of liquids or solids are prevented from penetrating through the porous formation. The ability of the drilling fluid to prevent excessive formation fluid penetration is called filtration control.

Materials that have been used in the past to control filtration rates of aqueous drilling fluids by plugging, producing cakes, or similar methods, have included materials such as pregelatinized starch, sodium carboxymethycellulose, sodium polyacrylates, and lignites. Each of these materials have certain limitations. For example, lignite becomes ineffective in high salt concentrations.

Acrylic and methacrylic derivatives, such as those which are copolymerized with hydrocarbon substituted styrenes, such as alpha methyl styrene, para methyl styrene, 2-4 dimethyl styrene, and the like, have been utilized in drilling fluids. For example, U.S. Pat. No. 2,718,497, to Oldham, et al, teaches the use of relatively high molecular weight polymers of these materials to control water loss characteristics of aqueous muds and clay dispersions. Additionally, U.S. Pat. No. 2,650,905 to Fordyce, et al, teaches the use of water soluble sulfonated polystyrene derivatives for filtration control in water-based drilling fluids.

The prior art has utilized derivatives of acrylic acid as thickeners for numerous commercial purposes, including utilization in drilling fluids. For example, U.S. Pat. No. 4,059,552 to Zweigle, et al, teaches the use of acrylamide-sodium acrylate or acrylic acid-substituted acrylates. A similar thickening material is disclosed in U.S. Pat. No. 4,037,035, to Blanc, et al, by utilization of an acrylamide-sodium acrylate constitute with an acrylamide-acrylic acid alkanolamine. Similarly, copolymers of acrylamide and sodium acrylate and acrylate derivatives thereof formed by irradiation polymerization are utilized as thickeners, as disclosed in U.S. Pat. No. 3,926,756 to Restaino. U.S. Pat. No. 3,897,404 to Korte, et al, teaches utilization as thickeners for printing paste and the like of substituted acrylamide-acrylic acid-acrylate derivatives.

Hydrophilic gels derived from 2-hydroxyethyl methacrylate have been found to be useful in a number of medical applications as material for gel filtration, such as copolymers of acrylamide, acrylic ester-2-hydroxyethyl methacrylate, as disclosed in U.S. Pat. No. 3,948,841 to Dusek.

Acrylamide-sodium acrylate-2-hydroxyethyl acrylate cross-linked agents of a comparatively high molecular weight are utilized as soil stabilizers as disclosed in U.S. Pat. No. 3,651,002, to Higashimura, et al.

Acrylic acid derivatives such as copolymers of acrylamide and sodium acrylate derivatives have been frequently and commercially utilized as flocculants for drilling fluids, and are disclosed in U.S. Pat. No. 3,558,545 and No. 3,472,325 to Lummus. Similarly, a copolymer derived from acrylic acid and acrylamide is disclosed in U.S. Pat. No. 3,323,603 to Lummus et.al, as a flocculant for aqueous drilling fluids.

Acrylamide/2-acrylamido-2-methyl propane sulfonate and polymers of N-sulfohydrocarbon-substituted acrylamides have been utilized as viscosifiers in water-flooding operations for secondary and tertiary petroleum recovery, such as in: U.S. Pat. No. 3,679,000 issued July 25, 1972, entitled "Secondary Oil Recovery Method Using N-Sulfohydrocarbon-substituted Acrylamide Polymers as Viscosity Increasing Agents"; "A Comparative Evaluation of Polymers for Oil Recovery-Rheological Properties", by Miklos T. Szabo, Society of Petroleum Engineers, A.I.M.E., Paper Number SPE 6601-A; and "Recent Advances in Ion-Containing Polymers", M. F. Hoover and G. B. Butler (J. Polymer SCL: Symposium No. 45, 1-37, 1974).

Acrylamide/2-acrylamido-2-methyl propane sulfonate copolymers in cross-linked and non-cross-linked forms have been utilized as a filtration control agent in aqueous drilling fluids, such as in: U.S. Pat. No. 4,293,427 Lucas et al, issued Oct. 6, 1981, entitled "Drilling Fluid Containing a Copolymer Filtration Control Agent".

U.S. Pat. No. 4,404,111 to Bi et al, teaches the use of N,N-dimethylacrylamide with 2-acrylamido-2-methyl propane sulfonic acid as a viscosity control agent in enhanced oil recovery operations. This use differs substantially from the present composition and method in that the Bi et al method is for enhanced oil recovery, while the present invention is directed toward the control of filter loss in fluids used in the drilling, completion or workover of subterranean wells. Moreover, the weight percentages of the monomeric reactants are almost completely inverted to those utilized in the present invention.

In the present invention, enhanced filtration control is obtained by incorporation into an aqueous drilling fluid a filtration control agent consisting essentially of a copolymer of: (1) a (meth)acrylamido alkyl sulfonic acid or alkali metal salt thereof; and (2) a N,N-dialkyl(meth)acrylamide. The copolymer of (1) and (2) may be enhanced by cross-linking with N,N'-alkylenebisacrylamide or other suitable monomers. Although it is not fully understood, it is believed that the copolymer together with the other drilling fluid constituents will produce a filter cake along the bore hole to maintain effective filtration control during circulation of the drilling fluid within the well.

It is an object of this invention to provide a filter cake which is substantially unaffected by comparatively high bore hole temperatures and pressures.

It is also an object of the present invention to provide a drilling fluid additive which is effectively insensitive to high concentrations of calcium ion.

It is a further object of this invention to provide a filtration control agent which will not materially affect the viscosity of the utilized drilling fluid system.

It is a further object of this invention to provide a comparatively low cost, easily prepared, filtration control agent for use in aqueous drilling fluids.

It is a further object of this invention to provide a filtration control agent for aqueous drilling fluids which functions in salt environments within the aqueous system.

It is a further object of this invention to provide a filtration control agent which may be utilized in weighted drilling fluids.

Other objects and advantages of the present invention will be easily appreciated by those skilled in the art from a reading of the description, examples and claims which follow.

SUMMARY OF THE INVENTION

The present invention provides a filter cake-producing substance which is effective after exposure to high temperatures and is operative in salt environments found in aqueous drilling fluids by utilization of a copolymer of: (1) a (meth)acrylamido alkyl sulfonic acid or alkali metal salt thereof: and (2) a N,N-dialkylacrylamide; or a cross-linked copolymer of (1) and (2) above. The copolymer is further characterized in that a 0.3% by weight aqueous solution of said copolymer has a viscosity at about 25° C. of between about 15 centipoises and about 84 centipoises.

DESCRIPTION OF THE PREFERRED EMBODIMENTS

The preparation of the copolymer of the present invention incorporates two monomeric materials, which are: (1) a (meth)acrylamido alkyl sulfonic acid or alkali metal salt thereof; and (2) a N,N-dialkyl(meth)acrylamide. The copolymer may be cross-linked with a suitable cross-linking agent such as N,N'-methylenebisacrylamide or N,N'-alkylenebisacrylamide.

In the preparation of the copolymer for use in the present invention, any acrylamido alkyl sulfonic acid or alkali metal salt thereof having from about 1 to about 4 carbon atoms in the alkyl portion may be utilized. For example, one may utilize 1-acrylamido propane sulfonic acid, or, preferably, the sodium salt thereof. Preferably, sodium 2-acrylamido-2-methyl propane sulfonate is utilized. In preparing the copolymer the 2-acrylamido-2-methyl propane sulfonic acid or alkali metal salt thereof may be used in a reagent range from between about 70 mole percent and about 100 mole percent. In the preferred composition, utilizing the sodium salt of 2-acrylamido-2-methyl propane sulfonate, an amount of about 90 mole percent will be incorporated as an initial reagent.

The present invention also utilizes as an initial reagent any N,N dialkyl(meth)acrylamide having from between about 1 and about 3 carbon atoms in each alkyl portion and which is capable of polymerization with the acrylamido alkyl sulfonic acid or alkali metal salt thereof, described above. Preferably, N,N-dimethyl acrylamide will be selected as the monomer because of its availability, water solubility, and ease of reaction with other reagents. When selecting this monomer for use in the present invention, this reagent should be utilized from between about 1 mole percent to about 30 mole percent. Preferably, about 10 mole percent of N,N-dimethylacrylamide will be utilized as an initial reagent.

Under some circumstances it may be desirable to provide the copolymer as a filtration control agent and drilling fluid additive in a cross-linked form to provide more effective filtration control in salt environments, such as sea water. In the preparation of a cross-linked copolymer, the cross-linking agent may be N,N'-methylenebisacrylamide, divinyl benzene, N-(iso-butoxymethyl)acrylamide and N-(methylol)acrylamide.

As utilized in the present invention, a reagent of N,N'-methylenebisacrylamide in an amount of about 0.1 mole percent of N,N'-methylenebisacrylamide may be used. Preferably, about 0.02 mole percent N,N'-methylenebisacrylamide will be utilized.

When preparing a cross-linked copolymer, one may utilize: between about 70 mole to about 100 mole percent (meth)acrylamido alkyl sulfonic acid or alkali metal salt thereof; between about 30 mole percent to about 1 mole percent N,N-dialkylacrylamide; and about 0.1 mole percent of an appropriate cross-linking agent. Preferably the cross-linked copolymer will comprise: about 90 mole percent (meth)acrylamide alkyl sulfonic acid or alkali metal salt thereof; and about 10 mole percent N,N dialkyl acrylamide; and about 0.02 mole percent of N,N'-methylenebisacrylamide.

The polymerization may be promoted by typical initiators used in aqueous systems such as peroxides, persulfates, persulfate-sulfites, and the like. It has been found that the copolymer can be made with small quantities of initiator when the reagents are warmed to about 60° C. The amount of initiator under such condition does not affect the properties of the copolymer as a filtration control agent.

The polymerization of the reagents set forth above may be carried out using a variety of techniques. For example, emulsion, suspension, solution or bulk polymerization techniques may be utilized. The preferred technique is solution.

As an effective filtration control agent, the copolymer may be added to any aqueous base drilling fluid at the drilling or rig location in an amount from between about 0.25 p.p.b to about 5 p.p.b (pounds per 42 gallon barrel). The amount needed will vary, of course, depending upon the particular type of aqueous drilling fluid utilized, such as brine, sea water, or the like, the weight of the given drilling fluid, the clayey substances or clayey materials appearing therein, and the presence and amount of other chemical additives, such as lignosulfonate deflocculants, and the like. Simple and commercially available testing techniques may be easily utilized at the well site to determine the amount of filtration control additive which must be added to the circulatable drilling fluid to provide effective filtration control in the subterranean well. Because of the loss of material in the well, such as through adsorption onto the surface of the drilled solids and the like, it may be necessary to incrementally add additions of the copolymer to the drilling fluid from time to time to maintain the required concentration.

Effectiveness of the copolymer to control the fluid loss from drilling fluids may be determined by utilization of a simple filtration test. A standardized procedure for determining the filtration rate is described in the A.P.I. Recommended Practice RP 13B, Section 3, "Standard Procedure for Testing Drilling Fluids", 9th Edition (May, 1982).

The preparation and use of the copolymer to control fluid loss in an aqueous drilling fluid is further described in the examples which follow.

EXAMPLE 1

The present Example demonstrates a preparation of the copolymer of the present invention wherein sodium 2-acrylamido-2-methyl propane sulfonate, and N,N-dimethylacrylamide are utilized as the initial monomeric reagents with and without a cross-linking agent. A solution was prepared by mixing 446.4 g water and 289.9 g of 50 percent caustic soda, which was cooled by an ice water bath, followed by incremental addition of 750.0 g of 2-acrylamido-2-methyl propane sulfonic acid. The acid was added at a rate to maintain the temperature of the solution below about 30° C. The pH of the solution was adjusted and maintained between about 6.8 and about 7.0. A charge of 40.7 g of 98 percent pure N,N-dimethylacrylamide was thereafter added. The solution was transferred to a stainless pan having dimensions of 33 cm long, 28 cm wide and 4 cm high. The solution, filling the pan to a depth of about 1.4 cm, was mixed with 56 g of an aqueous solution containing 1.84 g of ammonium persulfate. The mixture was allowed to stand at ambient temperature for about one hour. An exothermic reaction occurred causing the mixture to gel. The pan and mixture therein were placed in a 180° C. atmospheric conventional-style oven for about 2 hours.

Bubbles in the mass created by the evaporating water were punctured by an appropriate tool. The product in the pan after the described time was a yellow-colored brittle but friable mass. The copolymer was easily milled by an appropriate milling machine to a powder that passed through a 30 mesh U.S. Standard screen. The copolymer contained between about 8 to about 14 weight percent water. The product dried to a constant weight was analyzed for sulfur that was calculated to be 13.3 weight percent and was found to be 13.3±0.2.

A cross-linked copolymer was prepared, as above, by reacting 3.2 g of 96 percent pure N,N'-methylenebisacrylamide with the monomeric reagents prior to addition of the ammonium persulfate. The procedure and reaction was continued as described for the preparation of the un-cross-linked copolymer.

The monomeric composition of the samples given in Table I below are representative of the copolymer (Samples A through F) and the cross-linked copolymer (Samples G through J), of this invention.

TABLE I

| Sample | Sodium 2-Acrylamido-2-Methyl Propane Sulfonate (Mole %) | N,N—Dimethylacrylamide (Mole %) | N,N' Methylene bis Acrylamide (Mole %) | Viscosity 0.3 wt. % in Water at 540 sec −1 Shear Rate (Centipoises) | Sulfur Weight % Calc. | Sulfur Weight % Found |
|---|---|---|---|---|---|---|
| A | 100.0 | 0.0 | | 18 | | |
| B | 95.0 | 5.0 | | 22 | | |
| C | 90.0 | 10.0 | | 21 | 13.0 | 13.4 ± 0.1 |
| D | 85.0 | 15.0 | | 29 | | |
| E | 80.0 | 20.0 | | 32 | 12.7 | 12.5 ± 0.1 |
| F | 70.0 | 30.0 | | | 11.8 | 11.8 ± 0.3 |
| G | 90.4 | 9.6 | 0.01 | 15 | | |
| H | 90.4 | 9.6 | 0.02 | 24 | | |
| I | 90.4 | 9.6 | 0.05 | 83 | | |
| J | 90.3 | 9.6 | 0.11 | * | | |

*Partially insoluble.

EXAMPLE II

In the present Example, and the Examples which follow, the copolymer of the present invention was tested in simulated drilling fluid environments to determine filtration control characteristics. The indicated amount of the copolymer was slowly sifted into barrel equivalents of a base mud while shearing at moderate speed on an electric mixing apparatus after which shearing was continued for a period of 30 minutes. The pH of the sample was adjusted to about 9.5 with incremental additions of sodium hydroxide, when necessary. Thereafter, each sample was hot-rolled in an oven at 150° F. for 16 hours. Thereafter, each sample was permitted to cool to room temperature and the pH was readjusted to about 9.5, when necessary. Flow properties and A.P.I filtrate tests were performed. Thereafter, some of the samples were again hot-rolled at about 300° F. for the indicated time and thereafter cooled to room temperature, the pH again being readjusted to about 9.5, when necessary. Thereafter, flow properties and A.P.I. filtrate were again determined.

In the present Example, a mud system was prepared to simulate a sea water mud. The sample mud had the following composition: 20 lbs./bbl. bentonite; 10.7 lbs./bbl. of commercially available sea water salt; and 1½ lbs./bbl. chrome lignosulfonate. The pH of the mud composition was adjusted to about 9.5 with sodium hydroxide. A typical filtrate analysis of this base mud is as follows: 15,000 mg/l chloride ion; 900 mg/l total hardness, measured as calcium ion; and 400 mg/l calcium ion.

In the present Example, a mud sample was treated with the indicated copolymers described in Example I and evaluated, along with the base mud containing no additive, for purposes of determining effective filtration control, as well as for measuring the rheology of the fluid. The results of the tests are given in Table II below.

TABLE II

| Concentration lb/bbl. | Identification Sample | PV/YP[1] | Initial Gel | Ten Minute Gel | A.P.I. Filtrate (cm$^3$) |
|---|---|---|---|---|---|
| 1 | A | 12/2 | 2 | 10 | 23.3 |
| 2 | A | 19/3 | 2.5 | 8 | 19.3 |
| 1 | B | 22/7 | 6 | 3 | 15.9 |
| 1 | C | 12/3 | 3 | 10 | 18.6 |
| 2 | C | 18/8 | 4 | 13 | 13.4 |
| 1 | D | 19/9 | 7 | 24 | 14.6 |
| 1 | D | 12/4 | 3 | 9 | 15.1 |
| 2 | D | 17/10 | 5 | 14 | 11.6 |
| 2 | D | 16/19 | 10 | 33 | 11.9 |
| 1 | E | 33/1 | 6 | 23 | 14.1 |
| 1 | E | 15.5/17.5 | 4 | 13 | 16.1 |
| 2 | E | 30/12 | 7 | 2 | 10.2 |
| 2 | E | 19/7 | 5 | 11 | 11.5 |
| Blank | — | 9.5/0 | 1.5 | 6.0 | 49.0 |

[1]Plastic Viscosity/Yield Point.

EXAMPLE III

In order to determine the effect of temperature upon the ability of the filtration control agent of the present invention to effectively control filtration in a sea water mud sample, Sample "D", identified in Table I of Example I, was added to the simulated sea water mud identified in Example II at the 1 and 2 lb./bbl. concentration levels. Each sample was first hot-rolled at 150° F. for 16 hours after which rheological properties and A.P.I filtrate were measured. Thereafter, each sample was again hot-rolled at a temperature of 350° F. for 16 hours. Thereafter, the samples were permitted to cool, the pH was adjusted, and rheological properties and A.P.I. filtrate readings were taken. The results of this test indicate that this invention continues to provide filtration control even after exposure to temperatures above 300° F. The results of this test are compared with filtration control agents DRISPAC and CYPAN, and are set forth in Table III below.

TABLE III

| Sample No. | Hot-Rolled | FANN, RPM 600 | 300 | 200 | 100 | 6 | 3 | 1 G | 10 G | pH | A.P.I. Filtrate |
|---|---|---|---|---|---|---|---|---|---|---|---|
| C | 150° F. 16 hr. | 17.5 | 9.5 | 7 | 4 | 0.5 | 0.5 | 1 | 5 | 9.9 | 25.4 |
| Cypan* | | 25 | 13 | 9 | 5 | 1 | 0.5 | 0.5 | 2 | 9.9 | 20.0 |
| Drispac** (1 lb/bbl) | | 34 | 20 | 14.5 | 9 | 2 | 1 | 1.5 | 7 | 9.8 | 10.3 |
| C | 350° F. 16 hr. | 25 | 15 | 11 | 7 | 1 | 0.5 | 1 | 4 | 9.9 | 17.3 |
| Cypan | | 21 | 12.5 | 9.5 | 6 | 1 | 0.5 | 1 | 2 | 9.8 | 27.7 |
| Drispac (1 lb/bbl) | | 17 | 12 | 10 | 7 | 2 | 2 | 3 | 9 | 9.5 | 43.5 |
| C | 150° F. 16 hr. | 25 | 14.5 | 11 | 7 | 1 | 1 | 3 | 6 | 9.8 | 16.2 |
| Cypan | | 25 | 13 | 9.5 | 5.5 | 1 | 1 | 1 | 2 | 9.9 | 11.76 |
| Drispac (2 lb/bbl) | | 90 | 56 | 43 | 28 | 6 | 5 | 6 | 24 | 9.9 | 6.6 |
| C | 350° F. 16 hr. | 34 | 21 | 16 | 10 | 2 | 2 | 3 | 4 | 9.7 | 12.2 |
| Cypan | | 18 | 10 | 7 | 4 | 0.5 | 0.5 | 1 | 1 | 9.7 | 15.4 |
| Drispac (2 lb/bbl) | | 17 | 10 | 8 | 6 | 1 | 1 | 2 | 9 | 9.5 | 38.5 |
| Base Mud | 150° F. 16 hr. | 19 | 9 | 6.5 | 4 | 0.5 | 0.5 | 1 | 3 | 9.9 | 53.4 |
| | 350° F. 16 hr. | 26 | 18.5 | 15.5 | 12 | 7 | 7 | 10 | 32 | 9.9 | 56.8 |

*Cypan - A trademark of American Cyanamid - a sodium polyacrylate.
**Drispac - A trademark of Drilling Specialities Company - a polyanionic cellulose.

EXAMPLE IV

The present Example demonstrates the ability of the filtration control agent of the present invention to provide effective filtration control in saturated salt water and calcium ion containing saturated salt water muds. One saturated salt water mud (Mud IV A) comprised about 24 weight percent sodium chloride in water and 20 lbs./bbl. attapulgite clay. One calcium ion containing saturated salt water mud (Mud IV B) comprised about 24 weight percent sodium chloride in water, about 7,800 mg per liter calcium ion, about 1,100 mg per liter magnesium ion and 20 lbs./bbl. attapulgite clay. The rheological properties and A.P.I. filtrates of these muds were measured as in earlier tests. Table IV, below reflects the results of these tests.

TABLE IV A

| SATURATED SALT WATER MUD IV A | | | | | |
|---|---|---|---|---|---|
| Concentration lbs./bbl | Identification | °F. Temperature at 16 hours | PV/YP | 1 G/10 G | A.P.I. Filtrate |
| 3 | C | 160 | 16/11 | 3/8 | 11.5 |
| 4 | C | 160 | 17/3 | 5/16 | 10.1 |
| 3 | C | 350 | 6/8 | 1/2 | 26.8 |
| 4 | C | 350 | 18/3 | 1/1 | 13.3 |
| Base Mud | | 160 | 7/8 | 11/18 | 163.0 |

TABLE IV B

| CALCIUM CONTAINING SATURATED SALT WATER MUD IV B | | | | | |
|---|---|---|---|---|---|
| Concentration lbs./bbl | Identification | °F. Temperature at 16 hours | PV/YP | 1 G/10 G | A.P.I. Filtrate |
| 3 | C | 150 | 18/18 | 5/9 | 17.9 |
| 5 | C | 150 | 24/56 | 17/37 | 8.0 |
| 7 | C | 150 | 33/70 | 19/45 | 5.4 |
| 3 | C | 340 | 17/19 | 8/12 | 31.2 |
| 5 | C | 340 | 35/38 | 9/34 | 10.2 |
| 7 | C | 340 | 42/53 | 16/47 | 6.0 |

EXAMPLE V

In the present Example, the copolymer of the present invention was tested in a field mud from Louisiana to determine its filtration control characteristics. The undiluted amount of copolymer was slowly shifted into a barrel equivalent of a Louisiana field mud that contained 740 mg per liter chloride ion, 50 mg per liter calcium ion, and sufficient barium sulfate to weigh the mud to 13.0 lbs/gal. The copolymer was shifted into the mud while shearing at a moderate speed on an electric mixing apparatus, after which the shearing was continued for a period of 30 minutes. The pH of the sample was adjusted to 9.5 with incremental addition of sodium hydroxide, when necessary. The mud was heat-aged without agitation in a pressurized bomb at 350° F. for 16 hours. Thereafter, each sample was permitted to cool to room temperature and the pH adjusted to 9.5, when necessary. Flow properties and A.P.I filtrate tests were performed. Thereafter, the samples were heated and their HTHP filtrate volumes were measured at 300° F., using the procedures of "A.P.I. Recommended Practice, RB 13B, Section 3, Standard Procedure for Testing Drilling Fluids", 9th Edition (May, 1982). The results of the tests are given in Table V below.

TABLE V

| Concentration lbs/bbl | Identification Sample | PV/YP | 1 G/10 G | Filtrate, ml A.P.I. | HTHP |
|---|---|---|---|---|---|
| 0.5 | C | 28/18 | 11/57 | 6.4 | 26.0 |
| 1.0 | C | 38/32 | 14/56 | 5.3 | 22.0 |
| 2.0 | C | 54/55 | 38/95 | 4.3 | 15.2 |
| Base Mud | | 21/16 | 10/45 | 11.0 | 44.0 |

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In a method of drilling a well into a subterranean formation in which an aqueous drilling fluid containing clayey material is circulated into the well, the steps of forming a filter cake on the wall of the well to decrease loss of fluid from the drilling fluid, which comprises: (1) admixing with said drilling fluid an amount of at least about 0.5 weight percent of a copolymer of: (a) from between about 70 mole percent and about 100 mole percent of a (meth)acrylamido alkyl sulfonic acid or alkali metal salt thereof; and (b) from between about 30 mole percent and about 1 mole percent of N,N-dialkyl(meth)acrylamide, a 0.3 percent by weight aqueous solution of said copolymer having a viscosity at about 25° C. of from between about 18 centipoises and about 32 centipoises, as determined at a shear rate of 511 reciprocal seconds, the number of carbon atoms in the alkyl portion of the acrylamido-alkyl sulfonic acid or alkali metal salt thereof being about four, and the number of carbon atoms in the alkyl portion of the N,N-dialkyl(meth)acrylamide being from between about 1 and about 3.

2. The method of claim 1 wherein the amount of said (meth)acrylamido alkyl sulfonic acid or alkali metal salt thereof is about 90 mole percent and the amount of said dialkyl(meth)acrylamide is about 10 mole percent.

3. The method of claim 1 wherein said (meth)acrylamido alkyl sulfonic acid or alkali metal salt thereof is sodium 2-acrylamido-2-methyl propane sulfonate.

4. The method of claim 1 wherein said N,N-dialkyl(meth)acrylamide is N,N-dimethyl acrylamide.

5. The method of claim 1 wherein said (meth)acrylamido alkyl sulfonic acid or alkali metal salt thereof is sodium 2-acrylamido-2-methyl propane sulfonate in an amount of about 90 mole percent and said N,N-dialkyl(meth)acrylamide is N,N-dimethyl acrylamide in the amount of about 10 mole percent.

6. In a method of drilling a well into a subterraranean formation in which an aqueous drilling fluid containing clayey material is circulated into the well, the steps of forming a filter cake on the wall of the well to decrease loss of fluid from the drilling fluid, which comprises: (1) admixing with said drilling fluid an amount of at least about 0.25 pounds per 42-gallon barrel of a cross-linked copolymer of: (a) from between about 70 mole percent and about 100 mole percent of a (meth)acrylamide alkyl sulfonic acid or alkali metal salt thereof; (b) from between about 10 mole percent and about 1 mole percent of a N,N-dialkyl(meth)acrylamide; and (c) from about 0.1 mole percent of a cross-linking agent selected from the class consisting of N,N'-methylenebisacrylamide, divinyl benzene, N-(isobutoxymethyl)acrylamide and N-(methylol)acrylamide, a 0.3 percent by weight aqueous solution of said copolymer having a viscosity at about 25° C. between about 15 centipoises and about 84 centipoises, as determined at a shear rate of 511 reciprocal seconds, the number of carbon atoms in the alkyl portion of the acrylamido-alkyl sulfonic acid or alkali metal salt thereof being about four, and the number of carbon atoms in each alkyl portion of the N,N-dialkyl(meth)acrylamide being between from about 1 and about 3 and (2) circulating said drilling fluid in said well.

7. The method of claim 6 wherein the amount of said (meth)acrylamido alkyl sulfonic acid or alkali metal salt thereof is about 90 mole percent; the amount of said N,N-dialkyl(meth)acrylamide is about 10 mole percent; and the amount of said cross-linking agent is about 0.02 mole percent.

8. The method of claim 6 wherein said (meth)acrylamido alkyl sulfonic acid or alkali metal salt thereof is sodium 2-acrylamido-2-methyl propane sulfonate.

9. The method of claim 6 wherein said N,N-dialkyl(meth)acrylamide is N,N-dimethylacrylamide.

10. The method of claim 6 wherein said cross-linking agent is N,N'-methylenebisacrylamide.

11. The method of claim 6 wherein said (meth)acrylamido alkyl sulfonic acid or alkali metal salt thereof is sodium 2-acrylamido-2-methyl propane sulfonate in an amount of about 90 mole percent; said N,N-dialkyl(meth)acrylamide in the amount of about 10 mole percent; and said cross-linking agent is N,N'-methylenebisacrylamide in an amount of about 0.05 mole percent.

12. An aqueous drilling fluid comprising water, a clayey substance suspended in said water, and at least about 0.25 pounds per 42-gallon barrel of a copolymer of: (a) from between about 70 mole percent and about 100 mole percent of a (meth)acrylamide alkyl sulfonic acid or alkali metal salt thereof; and (b) from between about 30 mole percent and about 1 mole percent of N,N-dialkyl(meth)acrylamide, a 0.5 percent by weight aqueous solution of said copolymer having a viscosity of about 25° C. of from between about 15 centipoises and about 32 centipoises as determined at a shear rate of 511 reciprocal seconds, the number of carbon atoms in the alkyl portion of the acrylamidoalkyl sulfonic acid or alkali metal salt thereof being about four, and the number of carbon atoms in each alkyl portion of the N,N-dialkyl(meth)acrylamide being from between about 1 and about 3.

13. The drilling fluid of claim 12 wherein the amount of said N,N-dimethyl acrylamide or (meth) is about 10 mole percent.

14. The drilling fluid of claim 12 wherein the amount of said (meth)acrylamido alkyl sulfonic acid or alkali metal salt there of is about 90 mole percent and the amount of said N,N-dialkyl(meth)acrylamide is about 10 mole percent.

15. The drilling fluid of claim 12 wherein said (meth)acrylamido alkyl sulfonic acid or alkali metal salt thereof is sodium 2-acrylamido-2-methyl propane sulfonate.

16. The drilling fluid of claim 12 wherein said N,N dialkyl(meth)acrylamide is N,N-dimethyl acrylamide.

17. The drilling fluid of claim 12 wherein said (meth)acrylamido alkyl sulfonic acid or alkali metal salt thereof is sodium 2-acrylamido-2-methyl propane sulfonate in an amount of about 90 mole percent and said N,N-dialkyl(meth)acrylamide is N,N-dimethyl acrylamide in an amount of about 10 mole percent.

18. An aqueous drilling fluid comprising water, a clayey substance suspended in said water, and at least about 0.25 pounds per 42-gallon barrel of cross-linked copolymer of: (a) from between about 70 mole percent and about 100 mole percent of a (meth)acrylamide alkyl sulfonic acid or alkali metal salt thereof; (b) from between about 30 mole percent and about 1 mole percent of a N,N-dialkyl(meth)acrylamide; and (c) from between about 0.01 to about 0.05 mole percent of a cross-linking agent selected from N,N'-methylenebisacrylamide, divinyl benzene, N-(iso-butoxymethyl)acrylamide or N-(methylol)acrylamide, a 0.5 percent by weight aqueous solution of said copolymer having a viscosity at about 25° C. of from between about 15 centipoises and about 84 centipoises, as determined at a shear rate of 511 reciprocal seconds, the number of carbon atoms in the alkyl portion of the acrylamidoalkyl sulfonic acid or alkali metal salt thereof being about four, and the number of carbon atoms in each alkyl portions of the N,N-dialkyl(meth)acrylamide being from between about 1 and about 3.

19. The drilling fluid of claim 18 wherein the amount of said (meth)acrylamido alkyl sulfonic acid or alkali metal salt there of is about 90 mole percent; the amount of said N,N-dialkyl(meth)acrylamide is about 10 mole percent; and the amount of said cross-linking agent is about 0.02 mole percent.

20. The drilling fluid of claim 18 wherein said (meth)acrylamido alkyl sulfonic acid or alkali metal salt thereof is sodium 2-acrylamido-2-methyl propane sulfonate.

21. The drilling fluid of claim 18 wherein said N,N-dialkyl(meth)acrylamide is N,N-dimethyl acrylamide.

22. The drilling fluid of claim 18 wherein said cross-linking agent is N,N'-methylenebisacrylamide.

23. The drilling fluid of claim 18 wherein said (meth)acrylamido alkyl sulfonic acid or alkali metal salt thereof is sodium 2-acrylamido-2-methyl propane sulfonate in an amount of about 90 mole percent; said N,N-dialkyl acrylamide is N,N-dimethylacrylamide in an amount of about 10 mole percent; and said cross-linking agent is N,N'-methylenebisacrylamide in an amount of about 0.02 mole percent.

* * * * *